United States Patent
Mochizuki

(10) Patent No.: US 9,716,526 B2
(45) Date of Patent: Jul. 25, 2017

(54) WIRELESS MODULE, WIRELESS DEVICE, AND FIELD DEVICE CONTROL SYSTEM

(71) Applicant: Yokogawa Electric Corporation, Musashino-shi, Tokyo (JP)

(72) Inventor: Satoshi Mochizuki, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 14/917,601

(22) PCT Filed: Aug. 29, 2014

(86) PCT No.: PCT/JP2014/072801
§ 371 (c)(1),
(2) Date: Mar. 9, 2016

(87) PCT Pub. No.: WO2015/045737
PCT Pub. Date: Apr. 2, 2015

(65) Prior Publication Data
US 2016/0226550 A1    Aug. 4, 2016

(30) Foreign Application Priority Data
Sep. 30, 2013  (JP) ................................ 2013-202981

(51) Int. Cl.
H04B 1/18    (2006.01)
H04B 1/40    (2015.01)
H01Q 21/28   (2006.01)
H01Q 23/00   (2006.01)
H04B 7/06    (2006.01)
H04B 7/08    (2006.01)

(52) U.S. Cl.
CPC ............... *H04B 1/40* (2013.01); *H01Q 21/28* (2013.01); *H01Q 23/00* (2013.01); *H04B 1/18* (2013.01); *H04B 7/0602* (2013.01); *H04B 7/0802* (2013.01)

(58) Field of Classification Search
CPC ............. H04B 1/18; H04B 1/40; H01Q 21/28
See application file for complete search history.

(56) References Cited

U.S. PATENT DOCUMENTS

| 6,108,526 A | 8/2000 | van der Plas |
| 7,787,921 B2 * | 8/2010 | Gansen ............... H04B 1/3833 343/841 |
| 7,957,708 B2 * | 6/2011 | Karschnia ............. G08C 17/00 455/127.1 |

(Continued)

FOREIGN PATENT DOCUMENTS

| CN | 1722669 A | 1/2006 |
| EP | 1605566 A2 | 12/2005 |

(Continued)

*Primary Examiner* — Blane Jackson
(74) *Attorney, Agent, or Firm* — Sughrue Mion, PLLC

(57) ABSTRACT

A wireless module comprising includes an antenna connection end configured to be connected to external antennas, a circuit configured to select at least one of the external antennas connected to the antenna connection end, the circuit being configured to transmit and receive wireless signals by using the selected external antenna, and a first connector configured to input and output signals which are transmitted and received by the circuit.

15 Claims, 6 Drawing Sheets

(56) References Cited

U.S. PATENT DOCUMENTS

| | | | | |
|---|---|---|---|---|
| 8,818,455 B2* | 8/2014 | Harrison | ............. | H04M 1/0274 |
| | | | | 343/702 |
| 9,405,285 B2* | 8/2016 | Powell | ............... | G05B 19/0426 |
| 9,438,047 B2* | 9/2016 | Thoren | ............... | H01M 10/482 |
| 2004/0252073 A1* | 12/2004 | Kukita | ............... | H01R 13/7033 |
| | | | | 343/906 |
| 2008/0211664 A1 | 9/2008 | Griech et al. | | |
| 2014/0368291 A1 | 12/2014 | Mochizuki et al. | | |

FOREIGN PATENT DOCUMENTS

| | | | | | |
|---|---|---|---|---|---|
| JP | 2004-304313 | A | | 10/2004 | |
| JP | 2006-253844 | A | | 9/2006 | |
| JP | 2006253844 | A | * | 9/2006 | ............... H04B 1/40 |
| JP | 2007-28327 | A | | 2/2007 | |
| JP | 2007-306087 | A | | 11/2007 | |
| JP | 2011-205609 | A | | 10/2011 | |
| JP | 2012-161000 | A | | 8/2012 | |
| JP | 2013-162237 | A | | 8/2013 | |

* cited by examiner

WIRELESS MODULE, WIRELESS DEVICE, AND FIELD DEVICE CONTROL SYSTEM

CROSS REFERENCE TO RELATED APPLICATIONS

This application is a National Stage of International Application No. PCT/JP2014/072801 filed Aug. 29, 2014, claiming priority based on Japanese Patent Application No. 2013-202981 filed Sep. 30, 2013, the contents of all of which are incorporated herein by reference in their entirety.

TECHNICAL FIELD

The present invention relates to a wireless module, a wireless device, and a field device control system.

Priority is claimed on Japanese Patent Application No. 2013-202981, filed on Sep. 30, 2013, the contents of which are incorporated herein by reference.

BACKGROUND ART

Conventionally, in a plant and a factory, a DCS (Distributed Control System) is established in order to implement an advanced automatic operation. In the distributed control system, field devices (a measurement device and a manipulation device) and a controller controlling the field devices are connected to each other through a network. Although most of the field device included in the distributed control system performs wire communications, recently there is a device (wireless field device) which performs wireless communications in conformity with an industrial wireless communication protocol such as ISA100.11a, WirelessHART (registered trademark), and so on.

An input/output part, a wireless communicator, and a control part are included in a housing of the wireless field device, and each part is operated by electric power supplied from a single power source. An input/output part performs measurement or operation of state quantity (for example, pressure, temperature, flow quantity, and so on) in an industrial process. The wireless communicator performs wireless communications in conformity with the industrial wireless communication protocol described above. The control part totally controls an operation of the wireless field device. It is not necessary to connect the wireless field device to a communication line or a communication bus, different from the conventional field device. Since the wireless field device is basically installed in the plant independently, most of the wireless field device contains a battery as the single power source.

The following patent document 1 discloses that a wireless device is attached to the conventional field device which does not have a wireless communicator, and the wireless device is capable of operating the conventional field device as a wireless field device. Specifically, the wireless device disclosed in the following patent document 1 includes an interface, a wireless communicator, and a power source. The interface is connected to the conventional field device. The wireless communicator performs wireless communications. The power source supplies electric power to the conventional field device through the interface. In a case that a signal from the field device is input to the wireless device through the interface, the wireless device transmits the signal from the wireless communicator to a transmission destination (for example, a host controller). In a case that the wireless communicator receives a signal of which destination is the field device, the wireless device outputs the received signal to the field device through the interface.

CITATION LIST

Patent Literature

[Patent document 1] U.S. Patent Application Publication No. 2008/0211664

SUMMARY OF INVENTION

Technical Problem

By the way, like the field device, since the conventional wireless device disclosed in the above-described patent document 1 may be used in an environment where inflammable gas is used, the conventional wireless device is designed to meet an explosion-proof standard. The antenna is fixed to the wireless device so that the wireless device may satisfy requirements for the explosion-proof standard. The antenna is not dismountable from the wireless device. For this reason, the conventional wireless device has problems shown in the following (1) to (3).

(1) It may be difficult to perform stable wireless communications.

Most of the conventional wireless devices described above are installed near the field device in order to omit a work of installing a pipe (conduit) for protecting a connection line connected to the field device, and in order to suppress costs. However, since many pipelines and production facilities are installed, most of the field device is installed under an environment in which electric waves are easy to be reflected and blocked. For this reason, like the wireless device disclosed in the patent document 1, if the interface and the wireless communicator are integrated, there is a possibility that it is difficult to perform stable wireless communications.

(2) Type of the usable antenna is restricted.

In the conventional wireless device described above, it is ideal that arbitrary antennas according to necessary antenna characteristics (communicable distance and directivity) can be used. However, for example, a large-sized antenna (antenna with a large outer size and heavy weight) used when realizing long-distance communications has a problem that it cannot be used in consideration of a physical size, load resistance, and so on. As the result, the usable antenna is restricted to a lightweight antenna in the conventional wireless device described above, and it is difficult to perform the long-distance communications.

(3) An installation position and an installation angle of the antenna cannot be set up freely.

The conventional installation position and the installation angle of the wireless device are defined in accordance with a relation with the field device. For this reason, if the antenna is fixed to the wireless device, the installation position and the installation angle of the antenna are the same as the installation position and the installation angle of the wireless device which are defined in the relation with the field device, and there is a problem that the installation position and the installation angle of the antenna cannot be set up freely. As the result, stable wireless communications may be difficult.

In the conventional wireless device described above, in a case that an antenna can be dismounted from the wireless communicator by using an antenna cable in conformity with an explosion-proof standard, since a flexibility of an installation position of the antenna becomes high, it is thought that stable wireless communications can be performed. However, since a loss of a wireless signal which transmits the antenna cable is great and the signal tends to be influenced by a noise, a length of the cable which is extensible is limited. For the reason, it is thought that stable wireless communications are not necessarily realized.

An aspect of the present invention is to provide a wireless module, a wireless device, and a field device control system, which can realize stable wireless communications by using an arbitrary antenna in conformity with an explosion-proof standard.

Solution to Problem

A wireless module according to one aspect of the present invention may include an antenna connection end configured to be connected to external antennas, a circuit configured to select at least one of the external antennas connected to the antenna connection end, the circuit being configured to transmit and receive wireless signals by using the selected external antenna, and a first connector configured to input and output signals which are transmitted and received by the circuit.

In the wireless module according to one aspect of the present invention, the circuit may include a first switch configured to select one of the external antennas connected to the antenna connection end.

In the wireless module according to one aspect of the present invention, the circuit may include a second switch configured to switch whether to perform a selection by the first switch or a selection of all the external antennas connected to the antenna connection end.

The wireless module according to one aspect of the present invention may further include an internal antenna, and the circuit may include a third switch configured to select whether to use the external antennas or the internal antenna.

In the wireless module according to one aspect of the present invention, the circuit may output, through the antenna connection end, a control signal for selecting at least one external antenna of the external antennas connected to the antenna connection end.

The wireless module according to one aspect of the present invention may further include an internal antenna, and the circuit may include a third switch configured to select whether to use the external antennas or the internal antenna.

The wireless module according to one aspect of the present invention may further include a housing that stores the circuit to cover circumference of the circuit, and the housing may be made of material which blocks the wireless signals.

In the wireless module according to one aspect of the present invention, inside of the housing may be filled with resin.

In the wireless module according to one aspect of the present invention, a surface layer of the circuit may be coated with resin.

The wireless module according to one aspect of the present invention may further include an internal antenna and an antenna casing that stores the internal antenna, and the antenna casing may be made of material which transmits the wireless signals.

In the wireless module according to one aspect of the present invention, the internal antenna may be a microstrip antenna formed on a substrate.

A wireless device according to one aspect of the present invention may include an antenna connection module configured to be connected to antennas, and a wireless module configured to transmit signals to the antenna connection module and receive signals from the antenna connection module. The wireless module may include an antenna connection end configured to be connected to external antennas, a circuit configured to select at least one of the external antennas connected to the antenna connection end, the circuit being configured to transmit and receive wireless signals by using the selected external antenna, and a first connector configured to input and output signals which are transmitted and received by the circuit. The antenna connection module may include second connectors configured to be connected to the external antennas, and a third connector configured to be connected to the antenna connection end of the wireless module.

In the wireless device according to one aspect of the present invention, the circuit may include a first switch configured to select one of the external antennas connected to the antenna connection end.

In the wireless device according to one aspect of the present invention, the circuit may include a second switch configured to switch whether to perform a selection by the first switch or a selection of all the external antennas connected to the antenna connection end.

The wireless device according to one aspect of the present invention may further include an internal antenna, and the circuit may include a third switch configured to select whether to use the external antennas or the internal antenna.

In the wireless device according to one aspect of the present invention, the circuit may output, through the antenna connection end, a control signal for selecting at least one external antenna of the external antennas connected to the antenna connection end.

In the wireless device according to one aspect of the present invention, the antenna connection module may further include a switch configured to select the external antenna connected to the second connector based on the control signal output from the circuit.

A field device control system according to one aspect of the present invention may include a field device, a signal processing module configured to transmit signals to the field device and receive signals from the field device, an antenna connection module configured to be connected to antennas, and an wireless module configured to transmit signals between the antenna connection module and the signal processing module, and receive signals between the antenna connection module and the signal processing module. The wireless module may include an antenna connection end configured to be connected to external antennas, a circuit configured to select at least one of the external antennas connected to the antenna connection end, the circuit being configured to transmit and receive wireless signals by using the selected external antenna, and a first connector configured to input and output signals which are transmitted and received by the circuit. The antenna connection module may include second connectors configured to be connected to the external antennas, and a third connector configured to be connected to the antenna connection end of the wireless module.

In the field device control system according to one aspect of the present invention, the signal processing module may further include a fourth connector configured to input and output signals with respect to the wireless module, and a fifth connector configured to input and output signals with respect to the field device.

The field device control system according to one aspect of the present invention may further include a first cable configured to connect the antenna connection end and the third connector, and a second cable configured to connect the first connector and the fourth connector. A signal, which is transmitted from the field device to the signal processing module through the fifth connector, may be transmitted from the signal processing module to the wireless module through the second cable, and transmitted from the wireless module to the antenna connection module through the first cable. The wireless signal, which is received by the antenna connection module, may be transmitted from the antenna connection module to the wireless module through the first cable, transmitted from the wireless module to the signal processing module through the second cable, and transmitted from the signal processing module to the field device through the fifth connector.

Advantageous Effects of Invention

According to an aspect of the present invention, at least one of the external antennas connected to the antenna connection end is selected, a signal transmitted from outside (signal processing module) is received, and the signal is transmitted wirelessly from the selected external antenna. A wireless signal received by the selected external antenna is processed, and the processed wireless signal is transmitted to outside (signal processing module). For this reason, there is an effect that stable wireless communications can be realized by using an arbitrary antenna in conformity with an explosion-proof standard.

DESCRIPTION OF EMBODIMENTS

A wireless module, a wireless device, and a field device control system in embodiments of the present invention will be described in detail below with reference to drawings.

First Embodiment

Figure 1:
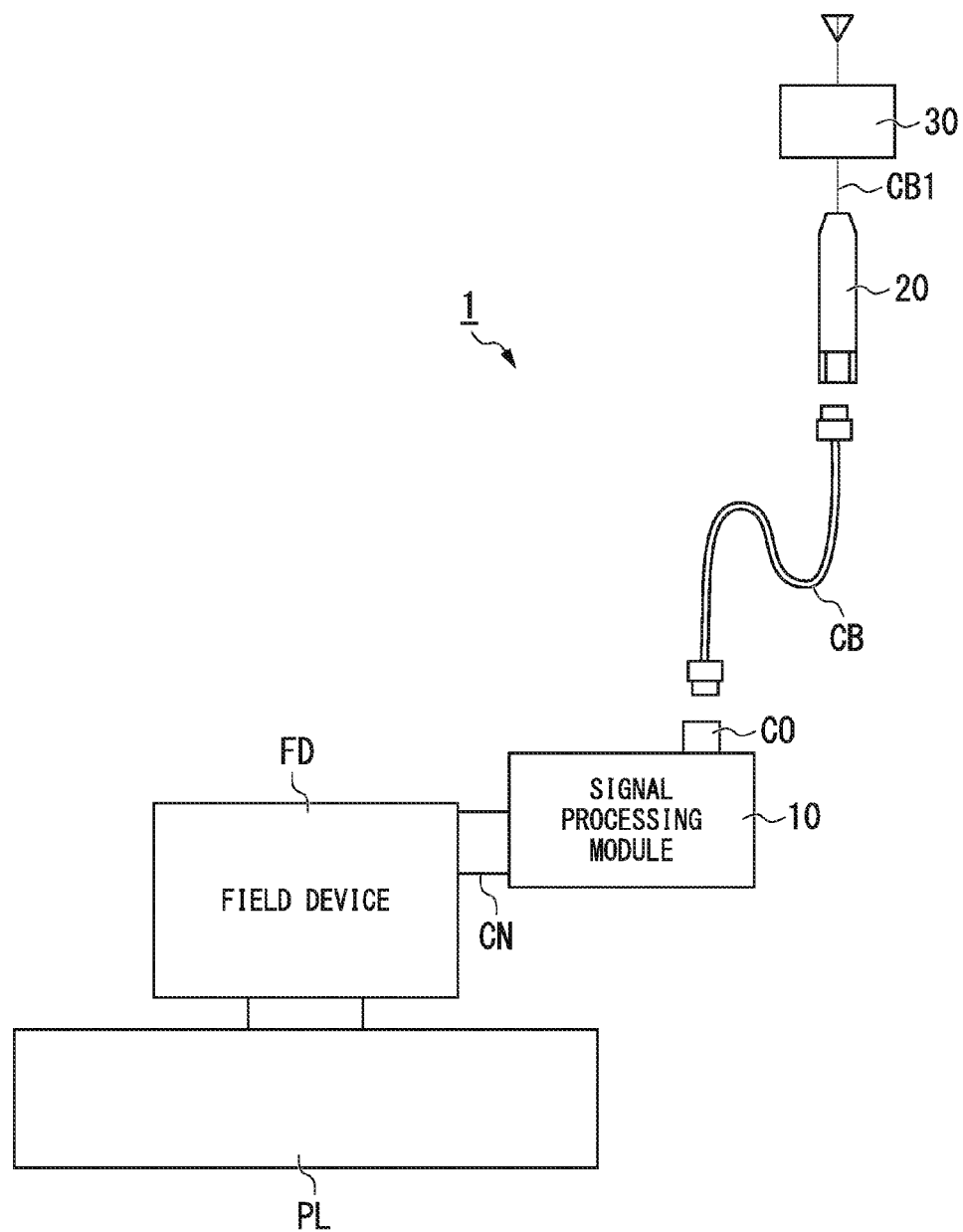
FIG. 1 is a drawing illustrating an example of the wireless device in a use state in a first embodiment of the present invention.

FIG. 1 is a drawing illustrating an example of the wireless device in a use state in a first embodiment of the present invention. As shown in FIG. 1, the wireless device 1 of the present embodiment is equipped with a signal processing module 10, a wireless module 20, and an antenna connection module 30. The wireless device 1 is connected to the field device FD which is mounted on a pipeline PL. The wireless device 1 transmits a wireless signal which is generated based on a signal from the field device FD, and receives a signal which is transmitted wirelessly and to be transmitted to the field device FD. The wireless device 1 meets an explosion-proof standard, and performs wireless communications in conformity with ISA100.11a.

Here, the field device FD is such as a sensor device (for example, a flowmeter and a temperature sensor), a valve device (for example, a flow control valve and an on-off valve), an actuator device (for example, a fan and a motor), an imaging device (for example, a camera and a video camera for recording circumstances and objects in the plant), a sound device (for example, a microphone collecting abnormal noise in the plant, and a speaker generating alarm sound), a position detection device outputting a position information of each device, and other devices installed in a field of the plant. Moreover, for example, the pipeline PL is a pipeline in which fluid such as crude oil and gas flows. In the present embodiment, in order to understand easily, the field device FD is a sensor device which measures flow quantity of the fluid which flows in the pipeline PL.

The field device FD is connected to a network and a transmission line (for example, a transmission line used for transmitting a signal of "4-20 mA") which are established in the field of the plant. The field device FD receives electric power from the network, and field device FD is capable of communicating through the network. Specifically, the field device FD is capable of communicate by using a general-purpose communication protocol for industrial process such as HART (registered trademark), BRAIN, Foundation Field bus (registered trademark), PROFIBUS (registered trademark), DeviceNet (registered trademark), CC-Link (registered trademark), and EtherNet/IP (registered trademark).

The signal processing module 10 is connected to the field device FD and the wireless module 20. The signal processing module 10 performs signal processing, such as communication processing with respect to the field device FD, communication processing with respect to the wireless module 20, and conversion processing of a communication protocol. Also, the signal processing module 10 is, so to speak, a relay module which relays various types of signals transmitted and received between the field device FD and the wireless module 20.

Specifically, the signal processing module 10 is connected to the field device FD by a connector CN. The signal processing module 10 communicates with the field device FD through the connector CN (analog communication or digital communication). That is, in order to enable the communication with the field device FD, the same communication protocol as the communication protocol implemented in the field device FD is implemented in the signal processing module 10.

Moreover, the signal processing module 10 is connected to the wireless module 20 through a cable CB and a connector mounted on the cable CB. The signal processing module 10 communicates with the wireless module 20 through the cable CB (for example, serial communication such as RS-422). In FIG. 1, although an example in which the signal processing module 10 and the wireless module 20 are connected to each other by the cable CB is shown, the wireless module 20 can be directly connected to the signal processing module 10, without using the cable CB. That is, a connector CO mounted on the signal processing module 10 can be connected to the cable CB, and can be also connected to the wireless module 20.

In a case that the signal processing module 10 and the wireless module 20 are connected to each other by using the cable CB, a flexibility of an installation position of the wireless module 20 can be improved. On the other hand, in a case that the wireless module 20 is directly connected to the signal processing module 10 without using the cable CB, the wireless device 1 can be used like the conventional wireless device to which the antenna is fixed. A multi-core shielded cable which has a power source line, a signal line, and a ground line is used as the cable CB.

The signal processing module 10 is equipped with a power source which is not shown in drawings. The signal processing module 10 supplies electric power to the wireless module 20 through the cable CB. As the power source, a battery (for example, a primary battery and a secondary battery with very little self-discharge, such as a thionyl chloride lithium battery), a fuel battery, a capacitor, or a power generation circuit that performs environmental power generation (so called, energy harvest such as a solar cell) can be used. The power source may be built in the signal processing module 10, and may be disposed outside the signal processing module 10.

The wireless module 20 is connected to the signal processing module 10 and the antenna connection module 30. The wireless module 20 communicates with the signal processing module 10. The wireless module 20 transmits and receives wireless signals by using the internal antenna AT0 or the external antennas AT1 to AT4 (refer to FIG. 2). Specifically, the wireless module 20 generates a wireless signal based on the signal transmitted from the signal processing module 10, and transmits the generated wireless signal from the internal antenna AT0 or the external antennas AT1 to AT4. The wireless module 20 processes the wireless signal received by the internal antenna AT0 or the external antennas AT1 to AT4, and transmits the processed signal toward the signal processing module 10.

Here, in a case that the wireless module 20 uses the external antennas AT1 to AT4, the wireless module 20 selects at least one external antenna among the external antennas AT1 to AT4 which are connected to the antenna connection module 30, and the wireless module 20 transmits and receives wireless signals. Specifically, the wireless module 20 selects one of the external antennas AT1 to AT4 in order to transmit and receive wireless signals, or the wireless module 20 selects all the external antennas AT1 to AT4 in order to transmit and receive wireless signals.

The antenna connection module 30 is a module which is used in order to connect the external antennas AT1 to AT4 to the wireless module 20. The antenna connection module 30 can be connected to the external antennas AT1 to AT4. The antenna connection module 30 is connected to the wireless module 20 through a coaxial cable CB1. As the coaxial cable CB1, a shielded cable which has core lines connected to each of the external antennas AT1 to AT4 is used.

Figure 2:
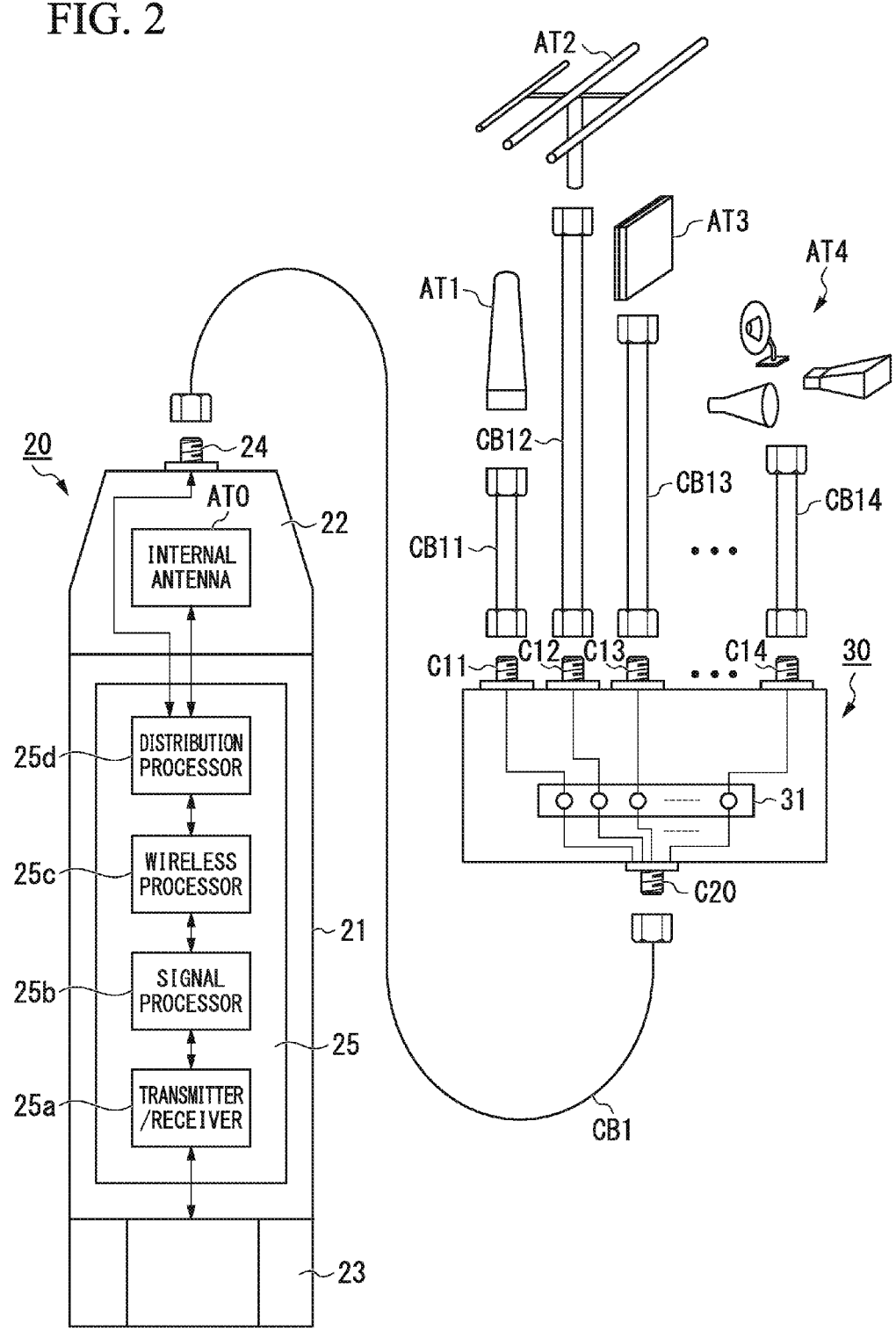
FIG. 2 is a block diagram illustrating a main configuration of the wireless module and the antenna connection module in the first embodiment of the present invention.

FIG. 2 is a block diagram illustrating a main configuration of the wireless module and the antenna connection module in the first embodiment of the present invention. As shown in FIG. 2, the wireless module 20 is equipped with a housing 21, an antenna cap 22, a connector 23, an antenna connection end 24, a circuit 25, and an internal antenna AT0. An outer shape of the wireless module 20 is a columnar shape or a polygonal columnar shape (for example, a square pillar shape). The housing 21 is a component which is tube-shaped (cylindrical or polygonal cylindrical) and made of material which blocks wireless signals, for example, metal with high rigidity, such as high rigidity aluminum. The housing 21 stores the circuit 25. Here, the circumference of the circuit 25 is covered with the metal housing 21, in order to suppress that the unnecessary radiation (for example, spurious radiation such as high order harmonics), which occurs in the circuit 25, leaks to outside the wireless module 20, as much as possible, and in order to prevent from having a bad influence on other wireless devices disposed around it. The inside of the housing 21 is filled with resin in order to meet an intrinsically safe explosion-proof standard. That is, the circuit 25 stored in the housing 21 is sealed by the resin with which the inside of the housing 21 is filled. Here, if the inside of the housing 21 is filled with resin, cost and weight of the wireless module 20 will increase. For this reason, the inside of the housing 21 may be partially filled with resin in order to coat only a surface of the circuit 25 with resin, without filling the inside of the housing 21 with resin. The antenna cap 22 stores the antenna AT0. The antenna cap 22 is a component made of resin in which wireless signals transmit.

The connector 23 is a connector which connects the wireless module 20 to the cable CB or the signal processing module 10. Since it is thought that the wireless module 20 is installed outdoors, it is desirable that the connector 23 meets waterproof-dustproof standards, such as IP (International Protection) standard and NEMA (National Electrical Manufacturers Association) standard. The antenna connection end 24 is a connection end to which the antenna connection module 30 is connected through the cable CB1. The antenna connection module 30 is connected to the antenna connection end 24 so that the external antennas AT1 to AT4 connected to the antenna connection module 30 are connected to the circuit 25. The antenna connection end 24 may be disposed at an end of the housing 21 of the wireless module 20 or an intermediate part of the housing 21.

The circuit 25 is equipped with a transmitter/receiver 25a, a signal processor 25b, a wireless processor 25c, and a distribution processor 25d. The circuit 25 of the configuration selects the internal antenna AT0 or at least one external antenna among the external antennas AT1 to AT4 connected to the antenna connection end 24. The circuit 25 generates a wireless signal based on the signal transmitted from the external signal processing module 10, and transmits the generated wireless signal from the selected antenna. The circuit 25 processes the wireless signal received by the selected antenna, and transmits the processed signal toward the signal processing module 10.

The transmitter/receiver 25a communicates with the signal processing module 10 through the cable CB (for example, serial communications, such as RS-422). Specifically, the transmitter/receiver 25a receives a signal which is transmitted from the signal processing module 10 through the connector 23, and outputs it to the signal processor 25b. Moreover, the transmitter/receiver 25a transmits, through the connector 23, a signal which is output from the signal processor 25b (a signal which is to be transmitted to the signal processing module 10).

The signal processor 25b performs predetermined signal processing with respect to the signal from the transmitter/receiver 25a or the signal from the wireless processor 25c. Specifically, the signal processor 25b performs synchronous processing, data conversion processing, communication protocol conversion processing, encryption processing, and modulation processing, with respect to the signal from the transmitter/receiver 25a. Moreover, the signal processor 25b performs demodulation processing, decoding processing, communication protocol conversion processing, data conversion processing, and synchronous processing, with respect to the signal from the wireless processor 25c.

Moreover, the signal processor 25b also performs control of switching and selecting the antenna. Specifically, the signal processor 25b controls the distribution processor 25d to select whether to use the internal antenna AT0 or the external antennas AT1 to AT4. In a case that the signal processor 25b uses the external antennas AT1 to AT4, the signal processor 25b controls the distribution processor 25d to select whether to use one of the external antennas AT1 to AT4 for transmitting and receiving wireless signals or all the external antennas AT1 to AT4 for transmitting and receiving wireless signals.

The wireless processor 25c generates a wireless signal which is to be transmitted from the internal antenna AT0 or the external antennas AT1 to AT4 by using the signal from the signal processor 25b, or the wireless processor 25c receives a wireless signal from the internal antenna AT0 or the external antennas AT1 to AT4. Specifically, the wireless processor 25c performs synchronous processing, encryption processing, and frequency conversion processing, with respect to the signal from the signal processor 25b. Moreover, the wireless processor 25c performs frequency conversion processing, composite processing, and synchronous processing, with respect to the wireless signal from the internal antenna AT0 or the external antennas AT1 to AT4.

The distribution processor 25d distributes a wireless signal under control of the signal processor 25b. Specifically, when a wireless signal is to be transmitted, the distribution processor 25d distributes a wireless signal so that the wireless signal generated by the wireless processor 25c is input into an antenna which is selected by a control of the signal processor 25b (the internal antenna AT0 or at least one external antenna among the external antennas AT1 to AT4). Moreover, when a wireless signal is to be received, the distribution processor 25d distributes a wireless signal so that the wireless signal received by an antenna, which is selected by a control of the signal processor 25b, is input into the wireless processor 25c.

Figure 3:
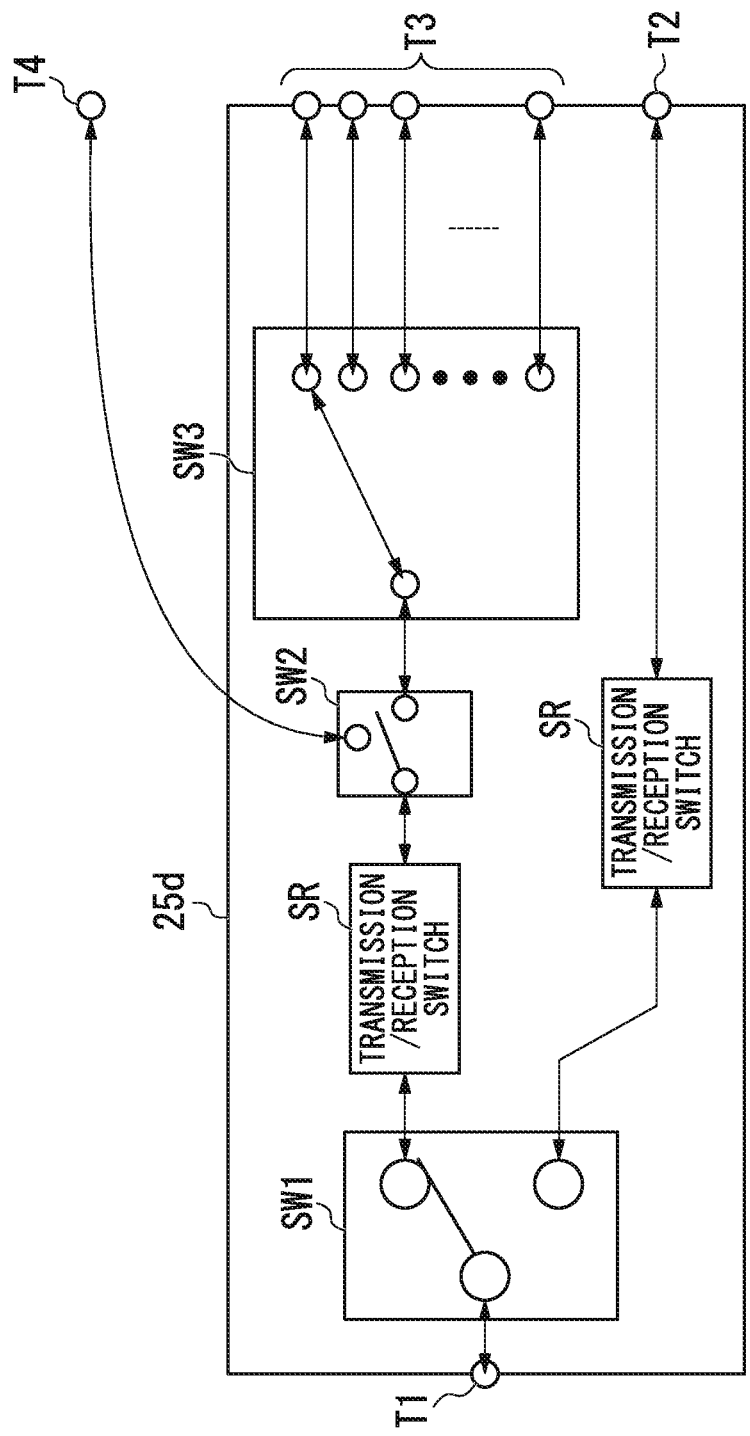
FIG. 3 is a block diagram illustrating configuration of the distribution processor disposed in the wireless module in the first embodiment of the present invention.

FIG. 3 is a block diagram illustrating configuration of the distribution processor disposed in the wireless module in the first embodiment of the present invention. As shown in FIG. 3, the distribution processor 25d is equipped with a switch SW1, a switch SW2, a switch SW3, and two transmission/reception switches SR. An input/output end T1 of the distribution processor 25d is connected to the wireless processor 25c, an input/output end T2 is connected to the internal antenna AT0, and input/output ends T3 and T4 are connected to the antenna connection module 30 through the antenna connection end 24. The input/output ends T3 are respectively and individually connected to connectors C11 to C14 mounted on the antenna connection module 30 (refer to FIG. 2: details will be described later). The input/output end T4 is connected to all the connectors C11 to C14.

The switch SW1 switches whether to connect the input/output end T1 to the input/output end T2 or to the input/output ends T3 and T4, under control of the signal processor 25b. As described above, the input/output end T2 is connected to the internal antenna AT0, and the input/output ends T3 and T4 are connected to the antenna connection module 30. For this reason, the switch SW1 is a switch for switching whether to use the internal antenna AT0 or the external antennas AT1 to AT4.

In a case that the switch SW1 is switched in order to connect the input/output ends T3 and T4 to the input/output end T1, the switch SW2 switches whether to connect the input/output end T1 to the input/output end T3 or to the input/output end T4, under the control of the signal processor 25b. As described above, the input/output ends T3 are respectively and individually connected to connectors C11 to C14 mounted on the antenna connection module 30, and the input/output end T4 is connected to all the connectors C11 to C14. For this reason, in a case of using the external antennas AT1 to AT4, the switch SW2 is a switch for switching whether to select one of the external antennas AT1 to AT4 or all the external antennas AT1 to AT4.

For example, the switch SW3 is SPnT (Single Pole n Throw) switch. In a case that the switches SW1 and SW2 are switched in order to connect the input/output end T3 to the input/output end T1, the switch SW3 is switched in order to connect one of the input/output ends T3 to the input/output end T1 under control of the signal processor 25b. That is, the switch SW3 is a switch for selecting one of the external antennas AT1 to AT4.

The transmission/reception switch SR is disposed between the switch SW1 and the switch SW2, and between the switch SW1 and the input/output end T2. The transmission/reception switch SR switches transmission and reception of a wireless signal under control of the signal processor 25b. Specifically, at a time of transmitting a wireless signal, the transmission/reception switch SR switches a route of the wireless signal so that the wireless signal, which was generated by the wireless processor 25c and passed through the switch SW1, can be output to the switch SW2 or to the input/output end T2. Moreover, at a time of receiving a wireless signal, the transmission/reception switch SR switches a route of the wireless signal so that the wireless signal, which passed through the switch SW2 or the input/output end T2, can be output to the wireless processor 25c through the switch SW1.

Figure 4:
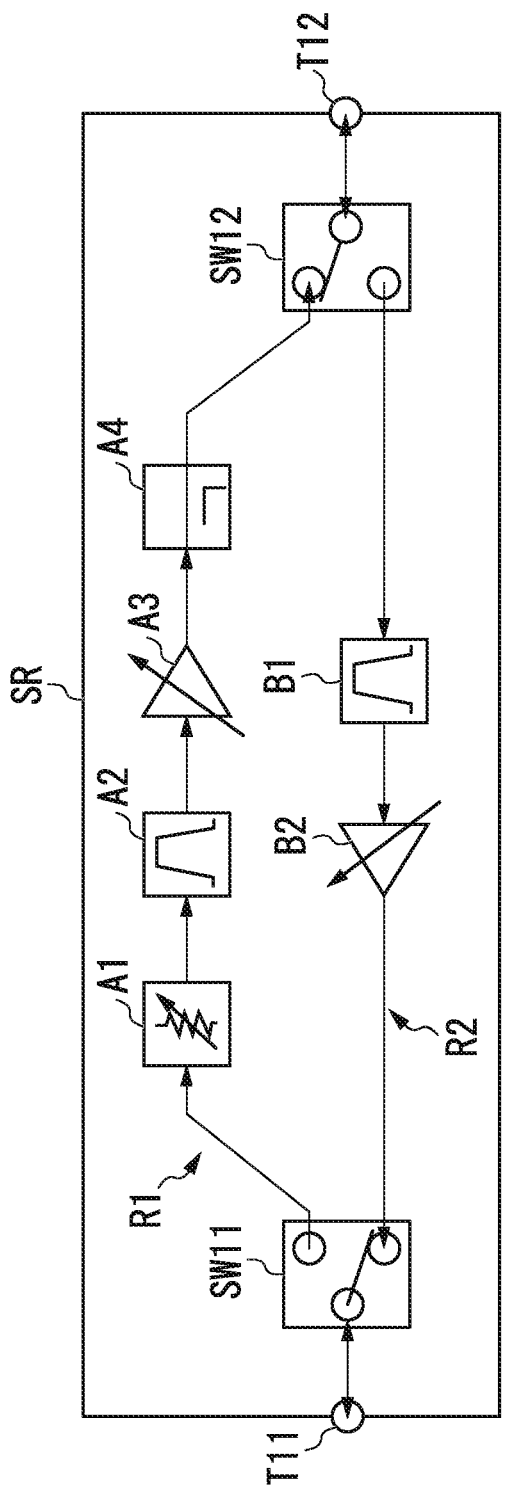
FIG. 4 is a block diagram illustrating configuration of the transmission/reception switch disposed in the wireless module in the first embodiment of the present invention.

FIG. 4 is a block diagram illustrating configuration of the transmission/reception switch disposed in the wireless module in the first embodiment of the present invention. As shown in FIG. 4, the transmission/reception switch SR is equipped with a switch SW11, a switch SW12, an output adjuster A1, a filter A2, a high frequency amplifier A3, an output level detector A4, a bandpass filter B1, and an amplifier B2. Out of them, the output adjuster A1, the filter A2, the high frequency amplifier A3, and the output level detector A4 are disposed on a transmission route R1, and the bandpass filter B1 and the amplifier B2 are disposed on a reception route R2. The transmission route R1 is a route through which the wireless signal generated by the wireless processor 25c passes. Moreover, the reception route R2 is a route through which the wireless signal received by the internal antenna AT0 or the external antennas AT1 to AT4 passes.

Under control of the signal processor 25b, the switch SW11 and the switch SW12 switch, to whether the transmission route R1 or the reception route R2, the route between an input/output end T11 and an input/output end T12. The input/output end T11 is connected to the switch SW1 shown in FIG. 3, and the input/output end T12 is connected to the switch SW2 or the input/output end T2 shown in FIG. 3. The output adjuster A1 is controlled by the signal processor 25b, and performs output adjustment of the wireless signal which is input from the input/output end T11 and passed through the switch SW11. The filter A2 removes spurious radiation, such as an image signal and high order harmonics, superimposed on the wireless signal which is from the output adjuster A1.

The high frequency amplifier A3 amplifies the wireless signal which passed through the filter A2 with a predetermined amplification factor. The amplification factor of the high frequency amplifier A3 is controlled by the signal processor 25b. The output level detector A4 detects an output level of the wireless signal which was amplified by the high frequency amplifier A3. A detection result of the output level detector A4 is output to the signal processor 25b, and used when the signal processor 25b controls an amplification factor or the like of the output adjuster A1 or the high frequency amplifier A3.

Only signal component of the wireless signal, which was input from the input/output end T12 and passed through the switch SW12, can pass through the bandpass filter B1. Thereby, the bandpass filter B1 removes noise component which is superimposed on the wireless signal. The amplifier B2 amplifies the wireless signal which passed through the bandpass filter B1 with a predetermined amplification factor. The amplification factor of the amplifier B2 is controlled by the signal processor 25b like the amplification factor of the high frequency amplifier A3.

Returning to FIG. 2, the internal antenna AT0 is connected to the input/output end T2 of the distribution processor 25d. The internal antenna AT0 transmits a wireless signal which is from the distribution processor 25d. Moreover, the internal antenna AT0 receives a wireless signal which is transmitted to the internal antenna AT0, and outputs it to the distribution processor 25d. The internal antenna AT0 may be a small antenna stored in the antenna cap 22. For example, a microstrip antenna formed on a substrate may be used as the internal antenna AT0.

The antenna connection module 30 is a hollow box-shaped module which is made of metal with high rigidity, such as high rigidity aluminum. The antenna connection module 30 is equipped with connectors C11 to C14 and a connector C20. The connectors C11 to C14 are connected to the external antennas AT1 to AT4 through antenna extension cables CB11 to CB14, respectively. The connector C20 is connected to the antenna connection end 24 of the wireless module 20 through the coaxial cable CB1.

The antenna connection module 30 includes a collection connector 31 inside thereof. The collection connector 31 collects connection lines connected to the connectors C11 to C14 respectively, and connects the connection lines to the connector C20. If the connector C20 of the antenna connection module 30 and the antenna connection end 24 of the wireless module 20 are connected by the coaxial cable CB1, the connectors C11 to C14 of the antenna connection module 30 are connected, one-to-one, to the input/output ends T3 (refer to FIG. 3) disposed in the distribution processor 25d of the wireless module 20. All the connectors C11 to C14 of the antenna connection module 30 are connected to the input/output end T4 (refer to FIG. 3) disposed in the distribution processor 25d of the wireless module 20.

Here, as the external antennas AT1 to AT4 connected to the antenna connection module 30, antennas such as a linear antenna (for example, a sleeve antenna, a whip antenna, a Yagi antenna, or the like), a flat antenna (for example, a patch antenna), an aperture antenna (for example, a horn antenna and a parabolic antenna), or the like, can be used. In FIG. 2, a whip antenna is illustrated as the external antenna AT1, a Yagi antenna is illustrated as the external antenna AT2, a patch antenna is illustrated as the external antenna AT3, and a horn antenna and a parabolic antenna are illustrated as the external antenna AT4.

Next, an operation of the wireless device 1 including the configuration described above will be described. Hereinafter, in order to understand easily, an operation (receiving operation) of selecting one (here, the external antenna AT1) of the external antennas AT1 to AT4 in order to receive a signal which is wirelessly transmitted and to the field device FD, and an operation (transmitting operation) of selecting all the external antennas AT1 to AT4 and generating a wireless signal based on the signal from the field device FD in order to transmit it, will be described as an example. The timing when the wireless device 1 transmits and receives wireless signals is preliminarily scheduled. The receiving operation and the transmitting operation are performed at a predetermined timing.

<Receiving Operation>

If the receiving operation is started, first, the wireless module 20 selects an external antenna (the external antenna AT1) which is to receive a transmitted wireless signal. Specifically, the switches SW1 to SW3 (refer to FIG. 3) of the distribution processor 25d are controlled by the signal processor 25b disposed in the wireless module 20, and one of the input/output ends T3 (the input/output end T3 connected to the external antenna AT1) is connected to the input/output end T1. In parallel with this, the switches SW11 and SW12 (refer to FIG. 4), which are disposed in the transmission/reception switch SR (the transmission/reception switch SR disposed between the switches SW1 and SW2) of the distribution processor 25d, are controlled by the signal processor 25b, and the reception route R2 is selected as a route between the input/output ends T11 and T12.

After the above operation is completed, if a wireless signal is received by the external antenna AT1, the wireless signal passes through the antenna connection module 30 and the coaxial cable CB1 in order, and the wireless signal is input into the wireless module 20. The wireless signal, which was input into the wireless module 20, is input into one of the input/output ends T3 shown in FIG. 3 (the input/output end T3 connected to the external antenna AT1). The wireless signal passes through the switch SW3 and the switch SW2 in order. The wireless signal is input into the transmission/reception switch SR. The wireless signal, which was input into the transmission/reception switch SR, passes the band pass filter B1 and the amplifier B2, which are disposed on the reception route R2, through the input/output end T12 shown in FIG. 4. Thereafter, the wireless signal is output from the input/output end T11. The wireless signal passes through the switch SW1 and the input/output end T1 in order, which are shown in FIG. 3. Thereafter, the wireless signal is input into the wireless processor 25c shown in FIG. 2.

The wireless processor 25c performs processing, such as frequency conversion processing, composite processing, and synchronous processing, with respect to the input signal which was input. The signal output from the wireless processor 25c is input into the signal processor 25b. The signal processor 25b performs signal processing, such as demodulation processing, decoding processing, communication protocol conversion processing, data conversion processing, and synchronous processing, with respect to the signal output from the wireless processor 25c. The signal to which the signal processor 25b performed signal processing is output to the transmitter/receiver 25a. The transmitter/receiver 25a transmits the signal, which was output from the signal processor 25b, toward the signal processing module 10 by communicating with signal processing module 10.

The signal transmitted from the wireless module 20 is input into the signal processing module 10 through the cable CB. The signal input into the signal processing module 10 is transmitted toward the field device FD through the connector CN, after signal processing such as communication protocol conversion processing is performed.

<Transmitting Operation>

If the transmitting operation is started, first, the wireless module 20 selects external antennas (all the external antennas AT1 to AT4) which are to transmit a wireless signal. Specifically, the switches SW1 to SW3 (refer to FIG. 3) of the distribution processor 25d are controlled by the signal processor 25b disposed in the wireless module 20, and the input/output end T4 (the input/output end T4 connected to all the external antennas AT1 to AT4) is connected to the input/output end T1. In parallel with this, the switches SW11 and SW12 (refer to FIG. 4), which are disposed in the transmission/reception switch SR (the transmission/reception switch SR disposed between the switches SW1 and SW2) of the distribution processor 25d, are controlled by the signal processor 25b, and the transmission route R1 is selected as a route between the input/output ends T11 and T12.

After the above operation is completed, if a signal is output from the field device FD, the signal is input into the signal processing module 10 through the connector CN. The signal input into the signal processing module 10 is transmitted toward the wireless module 20 by the communication performed between the signal processing module 10 and the wireless module 20, after signal processing such as communication protocol conversion processing is performed. The signal transmitted from the signal processing module 10 is input into the circuit 25 of the wireless module 20 through the cable CB.

The signal input into the circuit 25 is received by the transmitter/receiver 25a shown in FIG. 2, and is output to the signal processor 25b. The signal processor 25b performs signal processing, such as synchronous processing, data conversion processing, communication protocol conversion processing, encryption processing, and modulation processing, with respect to the signal output from the transmitter/receiver 25a. The signal to which the signal processor 25b performed the signal processing is output to the wireless processor 25c. The wireless processor 25c performs processing, such as synchronous processing, encryption processing, and frequency conversion processing, by using the signal from the signal processor 25b. A wireless signal is generated by the processing.

The wireless signal generated by the wireless processor 25c is input into the input/output end T1 of the distribution processor 25d shown in FIG. 3, and is input into the transmission/reception switch SR through the switch SW1. The wireless signal input into the transmission/reception switch SR is output from the input/output end T12, after the wireless signal passes, in order, the output adjuster A1, the filter A2, the high frequency amplifier A3, and the output level detector A4, which are disposed on the transmission route R1, through the input/output end T11 shown in FIG. 4. The wireless signal passes, in order, the switch SW2, the input/output end T4, which are shown in FIG. 3, and the coaxial cable CB1 shown in and FIG. 2. Thereafter, the wireless signal is transmitted to the antenna connection module 30. Thereby, the wireless signal is transmitted from all the external antennas AT1 to AT4 connected to the antenna connection module 30.

Although an example in which one of the external antennas AT1 to AT4 (the external antenna AT1) is selected in order to receive a wireless signal, and all the external antennas AT1 to AT4 is selected in order to transmit a wireless signal has been described, the antennas used for transmitting and receiving can be exchanged. That is, all the external antennas AT1 to AT4 may be selected in order to receive a wireless signal, and one of the external antennas AT1 to AT4 may be selected in order to transmit a wireless signal.

Moreover, all the external antennas AT1 to AT4 may be selected in order to perform both transmission and reception of wireless signals, and one of the external antennas AT1 to AT4 may be selected in order to perform both transmission and reception of wireless signals. For example, if frequency, communication distance, or direction (directivity angle) of wireless signals is clear, a suitable antenna of the external antennas AT1 to AT4 may be preliminarily selected to communicate so that a stable communication can be realized efficiently. Moreover, if frequency, communication distance, or direction (directivity angle) of wireless signals is not clear, all the external antennas AT1 to AT4 may be selected to communicate so that a stable communication can be realized generally (for example, if frequency or direction (directivity angle) of received wireless signals is not clear, all the external antennas AT1 to AT4 is selected so that the wireless signals can be received by an antenna which is the same frequency or direction (directivity angle) as the wireless signals.

Moreover, although an example in which wireless signals are transmitted and received by using the external antennas AT1 to AT4 has been described, wireless signals can be transmitted and received by using the internal antenna AT0. Moreover, wireless signals can be transmitted by using the external antennas AT1 to AT4, and wireless signals can be received by using the internal antenna AT0. Also, wireless signals can be transmitted by using the internal antenna AT0, and wireless signals can be received by using the external antennas AT1 to AT4. For example, in a case that a long-distance communication is performed, an antenna which is capable of performing the long-distance communication is selected among the external antennas AT1 to AT4. In a case that an indirectional short-distance communication is performed, the internal antenna AT0 is selected. Thereby, a stable communication can be realized efficiently.

As described above, in the wireless device 1 of the present embodiment, the signal processing module 10 which communicates with the field device FD, the wireless module 20 which performs wireless communications, and the antenna connection module 30 which can be connected to the external antennas AT1 to AT4 are disposed independently. Signals, which are transmitted and received between the signal processing module 10 and the wireless module 20, are transmitted and received through the cable CB. Thereby, in the present embodiment, the wireless module 20, the antenna connection module 30, and the external antennas AT1 to AT4 can be arranged in order to be separated from the signal processing module 10, without greatly separating the wireless module 20, the antenna connection module 30, and the external antennas AT1 to AT4 from each other. For this reason, flexibility of installation positions of the wireless module 20 in which the internal antenna AT0 is disposed and the external antennas AT1 to AT4 can be improved, and stable wireless communications can be realized in conformity with an explosion-proof standard.

Moreover, in the present embodiment, the antenna connection module 30 which can be connected to the external antennas AT1 to AT4 is connected to the wireless module 20, and the external antennas AT1 to AT4 used for transmitting and receiving wireless signals are selected by the wireless module 20. Thereby, arbitrary external antennas AT1 to AT4 can be used, and an installation position and an installation angle of the external antennas AT1 to AT4 can be set up freely. Therefore, if the external antennas AT1 to AT4 are installed in a place where a radio wave state is good, stable wireless communications can be performed. Thus, in the present embodiment, stable wireless communications can be realized by using an arbitrary antenna in conformity with an explosion-proof standard.

Second Embodiment

Figure 5:
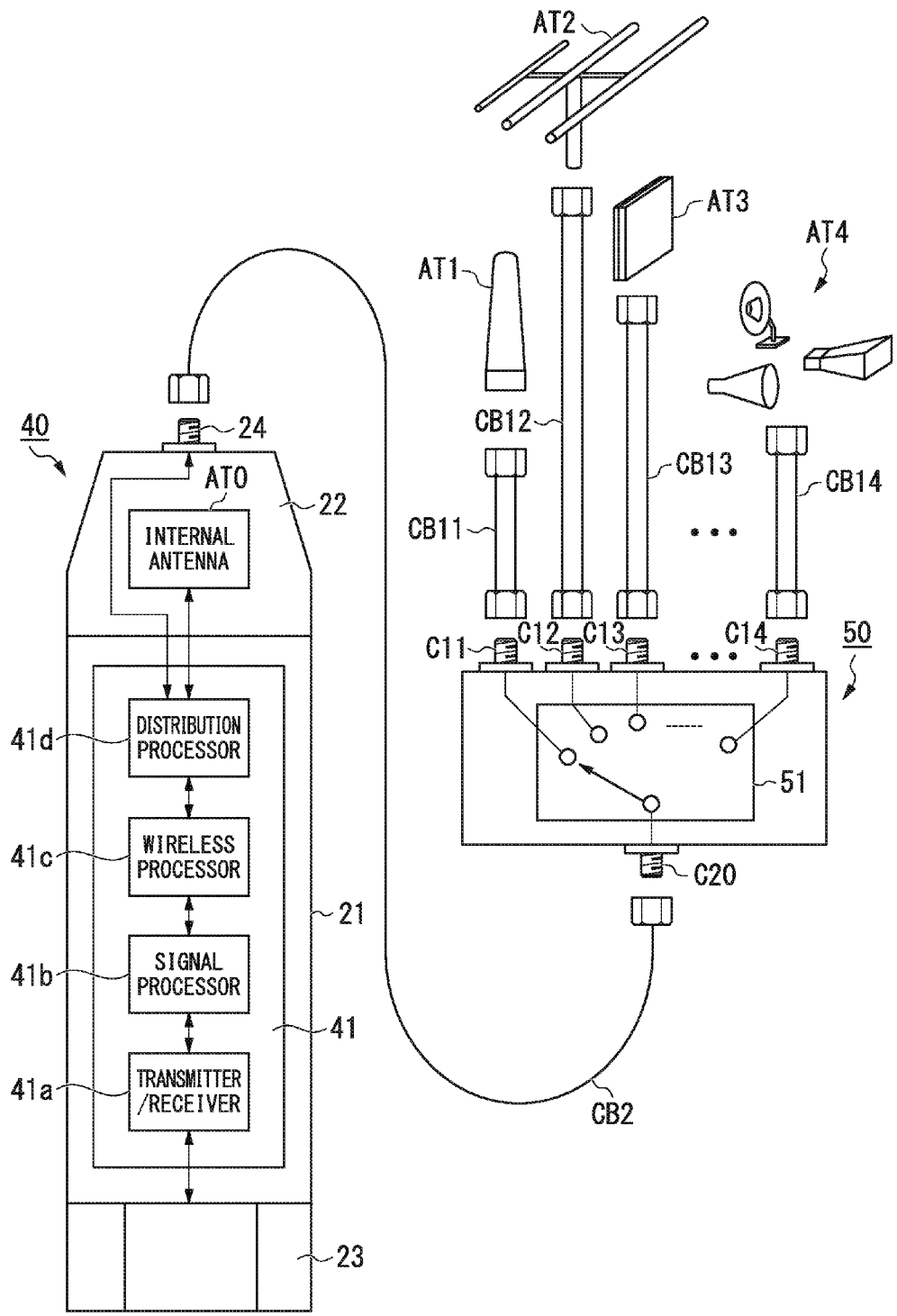
FIG. 5 is a block diagram illustrating a main configuration of the wireless module and the antenna connection module in the second embodiment of the present invention.

FIG. 5 is a block diagram illustrating a main configuration of the wireless module and the antenna connection module in the second embodiment of the present invention. In FIG. 5, parts that correspond to those in FIG. 2 are assigned the same reference numerals. A wireless device of the present embodiment is equipped with a wireless module 40 and an antenna connection module 50 which are shown in FIG. 5, instead of the wireless module 20 and the antenna connection module 30 which are shown in FIG. 1. Although not shown in drawings, the wireless device of the present embodiment is called "wireless device 2" below.

In the above-described wireless device 1 of the first embodiment, the switches (the switches SW1 to SW3 in FIG. 3) are disposed in the wireless module 20, and the wireless module 20 switches and selects the external antennas AT1 to AT4. On the other hand, in the wireless device 2 of the present embodiment, a switch corresponding to the switches SW2 and SW3 is disposed in the antenna connection module 50, and the wireless module 40 controls the antenna connection module 50 to switch and select the external antennas AT1 to AT4.

As shown in FIG. 5, the wireless module 40 is equipped with a circuit 41, instead of the circuit 25 of the wireless module 20 shown in FIG. 2. The circuit 41 is equipped with a transmitter/receiver 41a, a signal processor 41b, a wireless processor 41c, and a distribution processor 41d. The circuit 41 of the configuration outputs a control signal for selecting the internal antenna AT0 or at least one external antenna among the external antennas AT1 to AT4 connected to the antenna connection end 24. The circuit 41 generates a wireless signal based on the signal transmitted from the signal processing module 10, and transmits the generated wireless signal from the selected antenna. The circuit 41 processes the wireless signal received by the selected antenna, and transmits the processed signal toward the signal processing module 10.

The transmitter/receiver 41a communicates with the signal processing module 10 through the cable CB (for example, serial communications, such as RS-422), like the transmitter/receiver 25a shown in FIG. 2. The signal processor 41b performs predetermined signal processing with respect to the signal from the transmitter/receiver 41a or the signal from the wireless processor 41c. Specific signal processing performed by the signal processor 41b is the same as the signal processing performed by the signal processor 25b shown in FIG. 2.

Moreover, the signal processor 41b outputs a control signal for switching or selecting the antenna. Specifically, the signal processor 41b outputs, to the distribution processor 41d, a control signal for switching whether to use the internal antenna AT0 or the external antennas AT1 to AT4. In a case that the external antennas AT1 to AT4 are used, the signal processor 41b outputs, to the antenna connection end 24, a control signal for switching whether to select one of the external antennas AT1 to AT4 for transmitting and receiving wireless signals or all the external antennas AT1 to AT4 for transmitting and receiving wireless signals. Here, as the control signal output from the signal processor 41b, for example, a DC (direct current) signal to which different voltage according to the selected antenna is set can be used.

The wireless processor 41c generates a wireless signal which is to be transmitted from the internal antenna AT0 or the external antennas AT1 to AT4 by using the signal from the signal processor 41b, or the wireless processor 41c receives a wireless signal from the internal antenna AT0 or the external antennas AT1 to AT4. Specific processing performed by the wireless processor 41c is the same as the processing performed by the wireless processor 25c shown in FIG. 2.

The distribution processor 41d distributes a wireless signal under control of the signal processor 41b. Specifically, when a wireless signal is to be transmitted, the distribution processor 41d distributes a wireless signal so that the wireless signal generated by the wireless processor 41c is input into an antenna which is selected based on the control signal from the signal processor 41b (the internal antenna AT0 or at least one external antenna of the external antennas AT1 to AT4). Moreover, when a wireless signal is to be received, the distribution processor 41d distributes a wireless signal so that the wireless signal received by an antenna, which is selected based on the control signal from the signal processor 41b, is input into the wireless processor 41c.

Figure 6:
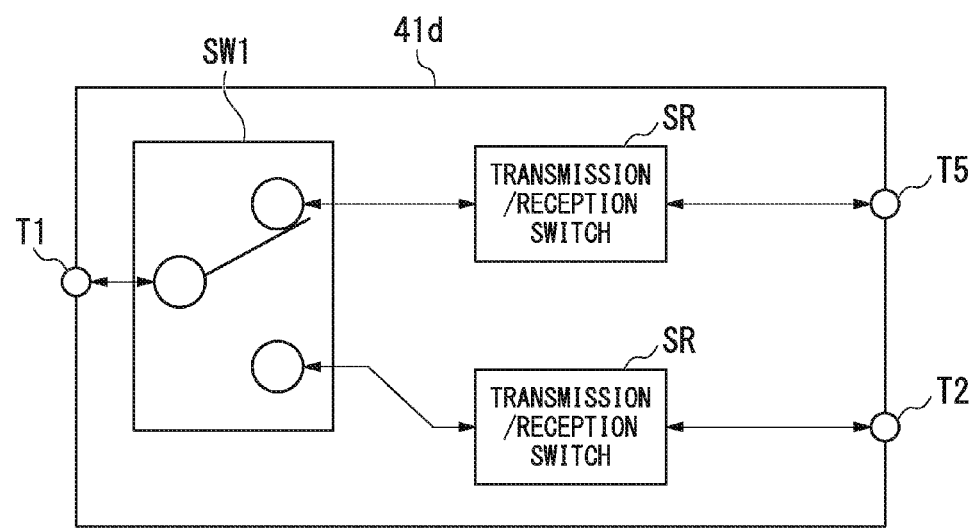
FIG. 6 is a block diagram illustrating configuration of the distribution processor disposed in the wireless module in the second embodiment of the present invention.

FIG. 6 is a block diagram illustrating configuration of the distribution processor disposed in the wireless module in the second embodiment of the present invention. In FIG. 6, parts that correspond to those in FIG. 3 are assigned the same reference numerals. As shown in FIG. 6, the distribution processor 41d is equipped with a switch SW1 and two transmission/reception switches SR. An input/output end T1 of the distribution processor 41d is connected to the wireless processor 41c, an input/output end T2 is connected to the internal antenna AT0, and input/output end T5 is connected to the antenna connection module 50 through the antenna connection end 24.

The switch SW1 shown in FIG. 6 is the same as the switch SW1 shown in FIG. 3. The switch SW1 switches whether to connect the input/output end T1 to the input/output end T2 or to the input/output end T5, under control of the signal processor 41b. As described above, the input/output end T2 is connected to the internal antenna AT0, and the input/output end T5 is connected to the antenna connection module 50. For this reason, the switch SW1 is a switch for switching whether to use the internal antenna AT0 or the external antennas AT1 to AT4. The transmission/reception switch SR shown in FIG. 6 is the same as the transmission/reception switch SR shown in FIG. 4.

Returning to FIG. 5, the antenna connection module 50 is a module used in order to connect the external antennas AT1 to AT4 to the wireless module 40, like the antenna connection module 30 shown in FIG. 2. The antenna connection module 50 is connected to the wireless module 40 through the coaxial cable CB2. A shielded cable which has a single core line is used as the coaxial cable CB2.

The antenna connection module 50 is a hollow box-shaped module which is made of metal with high rigidity, such as high rigidity aluminum, like the antenna connection module 30 shown in FIG. 2. The antenna connection module 50 is equipped with connectors C11 to C14 and a connector C20. The antenna connection module 50 includes a switch 51 inside thereof.

The switch 51 selects the external antennas AT1 to AT4 connected to the connectors C11 to C14 based on a control signal from the wireless module 40 (the control signal which was output from the signal processor 41b, and passed through the antenna connection end 24 and the coaxial cable CB2). The switch 51 may be equipped with a switch which is the same as the switch SW3 shown in FIG. 3 or a switch which is the same as the switch in which the switch SW2 is connected to the switch SW3 as shown in FIG. 3. The switch 51 can also select one external antenna among the external antennas AT1 to AT4, and can also select all the external antennas AT1 to AT4, based on the control signal from the wireless module 40. The external antenna selected by the switch 51 is connected to the wireless module 40 through the coaxial cable CB2.

Here, the same antenna as the external antennas AT1 to AT4 connected to the antenna connection module 30 shown in FIG. 2 can be connected to the antenna connection module 50. Specifically, arbitrary antennas such as a linear antenna (for example, a sleeve antenna, a whip antenna, a Yagi antenna, or the like), a flat antenna (for example, a patch antenna), an aperture antenna (for example, a horn antenna and a parabolic antenna), or the like, can be connected to the antenna connection module 50.

The wireless device 2 of the present embodiment differs from the wireless device 1 of the first embodiment in a point that the wireless module 40 controls the antenna connection module 50 to switch and select the external antennas AT1 to AT4, and transmission and reception of wireless signals are performed by the almost same operation as the wireless device 1 of the first embodiment. For this reason, detail description of operation of the wireless device 2 will be omitted.

As described above, in the wireless device 2 of the present embodiment, the signal processing module 10, the wireless module 40 which performs wireless communications, and the antenna connection module 50 which can be connected to the external antennas AT1 to AT4 are separated from each other, and the signals, which are transmitted and received between the signal processing module 10 and the wireless module 40, are transmitted and received through the cable CB. Thereby, like the first embodiment, the wireless module 40, the antenna connection module 50, and the external antennas AT1 to AT4 can be arranged in order to be separated from the signal processing module 10, without greatly separating the wireless module 40, the antenna connection module 50, and the external antennas AT1 to AT4 from each other. For this reason, flexibility of installation positions of the wireless module 40 in which the internal antenna AT0 is disposed and the external antennas AT1 to AT4 can be improved, and stable wireless communications can be realized in conformity with an explosion-proof standard.

Moreover, in the present embodiment, the antenna connection module 50 which can be connected to the external antennas AT1 to AT4 is connected to the wireless module 40, and the external antennas AT1 to AT4, which are used for transmission and reception by the antenna connection module 50, is selected by a control of the wireless module 40. Thereby, arbitrary external antennas AT1 to AT4 can be used, and an installation position and an installation angle of the external antennas AT1 to AT4 can be set up freely. Therefore, if the external antennas AT1 to AT4 are installed in a place where a radio wave state is good, stable wireless communications can be performed. Thus, in the present embodiment, stable wireless communications can be realized by using an arbitrary antenna in conformity with an explosion-proof standard.

As described above, although a wireless module, a wireless device, and a field device control system according to embodiments of the present invention have been described above, the present invention is not restricted to the above-described embodiments, and can be freely modified within the scope thereof. For example, the wireless modules 20 and 40 described in the embodiments select one of the external antennas AT1 to AT4 in order to transmit and receive wireless signals, or the wireless modules 20 and 40 select all the external antennas AT1 to AT4 in order to transmit and receive wireless signals. However, two or three external antennas among the external antennas AT1 to AT4 may be selected to transmit and receive wireless signals.

Moreover, in the above-described embodiment, an example in which a power source is disposed in the signal processing module 10, and electric power is supplied from the signal processing module 10 to the wireless module 20, has been described. However, the power source of the signal processing module 10 may be omitted, and electric power may be supplied from the field device FD to the signal processing module 10 and the wireless module 20. Moreover, a power source may be disposed in the wireless module 20.

In the above-described embodiment, although the foregoing descriptions of the embodiments have been examples in which the wireless device 1 measures flow quantity of fluid as state quantity in an industrial process, the present invention can be also applied to a wireless device which measures the other state quantity (for example, pressure, temperature, and so on). Moreover, in the above-described embodiment, although the foregoing descriptions of the embodiments have been examples in which the wireless device performs wireless communications in conformity with ISA100.11a, the present invention can be also applied to a wireless device which performs wireless communications in conformity with WirelessHART (registered trademark), a wireless device which performs wireless communications in conformity with Wi-Fi (registered trademark), or a wireless device which performs wireless communications in conformity with ZigBee (registered trademark).

REFERENCE SIGNS LIST 1, 2 Wireless device
10 Signal processing module
20 Wireless module
23 Connector
24 Antenna connection end
25 Circuit
30 Antenna connection module
40 Wireless module
41 Circuit
50 Antenna connection module
51 Switch
AT0 Inner antenna
AT1 to AT4 External antenna
C11 to C14 Connector
C20 Connector
FD Field device
SW1 to SW3 Switch

The invention claimed is:
1. A wireless module comprising:
an antenna connection end configured to be connected to external antennas;
a circuit configured to select at least one of the external antennas connected to the antenna connection end, the circuit being configured to transmit and receive wireless signals by using the selected external antenna; and
a connector configured to input and output signals which are transmitted and received by the circuit,
wherein the circuit comprises:

an external antenna selection switch configured to select one of the external antennas connected to the antenna connection end; and
an antenna group selection switch configured to switch whether to perform a selection by the external antenna selection switch or a selection of all the external antennas connected to the antenna connection end.

2. A wireless module comprising:
an antenna connection end configured to be connected to external antennas;
a circuit configured to select at least one of the external antennas connected to the antenna connection end, the circuit being configured to transmit and receive wireless signals by using the selected external antenna;
a connector configured to input and output signals which are transmitted and received by the circuit; and
an internal antenna,
wherein the circuit comprises:
an internal/external antenna selection switch configured to select whether to use the external antennas or the internal antenna.

3. A wireless module comprising:
an antenna connection end configured to be connected to external antennas;
a circuit configured to select at least one of the external antennas connected to the antenna connection end, the circuit being configured to transmit and receive wireless signals by using the selected external antenna;
a connector configured to input and output signals which are transmitted and received by the circuit; and
an internal antenna,
wherein the circuit outputs, through the antenna connection end, a control signal for selecting at least one external antenna of the external antennas connected to the antenna connection end, and
wherein the circuit comprises:
an internal/external antenna selection switch configured to select whether to use the external antennas or the internal antenna.

4. A wireless module comprising:
an antenna connection end configured to be connected to external antennas;
a circuit configured to select at least one of the external antennas connected to the antenna connection end, the circuit being configured to transmit and receive wireless signals by using the selected external antenna;
a connector configured to input and output signals which are transmitted and received by the circuit; and
a housing that stores the circuit to cover circumference of the circuit,
wherein the housing is made of material which blocks the wireless signals, and
wherein inside of the housing is filled with resin.

5. A wireless module comprising:
an antenna connection end configured to be connected to external antennas;
a circuit configured to select at least one of the external antennas connected to the antenna connection end, the circuit being configured to transmit and receive wireless signals by using the selected external antenna; and
a connector configured to input and output signals which are transmitted and received by the circuit
wherein a surface layer of the circuit is coated with resin.

6. A wireless module comprising:
an antenna connection end configured to be connected to external antennas;
a circuit configured to select at least one of the external antennas connected to the antenna connection end, the circuit being configured to transmit and receive wireless signals by using the selected external antenna;
a connector configured to input and output signals which are transmitted and received by the circuit;
an internal antenna; and
an antenna casing that stores the internal antenna,
wherein the antenna casing is made of material which transmits the wireless signals.

7. The wireless module according to claim 6, wherein the internal antenna is a microstrip antenna formed on a substrate.

8. A wireless device comprising:
an antenna connection module configured to be connected to antennas; and
a wireless module configured to transmit signals to the antenna connection module and receive signals from the antenna connection module,
wherein the wireless module comprises:
an antenna connection end configured to be connected to external antennas;
a circuit configured to select at least one of the external antennas connected to the antenna connection end, the circuit being configured to transmit and receive wireless signals by using the selected external antenna; and
a first connector configured to input and output signals which are transmitted and received by the circuit,
wherein the antenna connection module comprises:
second connectors configured to be connected to the external antennas; and
a third connector configured to be connected to the antenna connection end of the wireless module,
wherein the circuit comprises:
an external antenna selection switch configured to select one of the external antennas connected to the antenna connection end, and
wherein the circuit comprises:
an antenna group selection switch configured to switch whether to perform a selection by the external antenna selection switch or a selection of all the external antennas connected to the antenna connection end.

9. A wireless device comprising:
an antenna connection module configured to be connected to antennas; and
an wireless module configured to transmit signals to the antenna connection module, and receive signals from the antenna connection module,
wherein the wireless module comprises:
an antenna connection end configured to be connected to external antennas;
a circuit configured to select at least one of the external antennas connected to the antenna connection end, the circuit being configured to transmit and receive wireless signals by using the selected external antenna; and
a first connector configured to input and output signals which are transmitted and received by the circuit,
wherein the antenna connection module comprises:
second connectors configured to be connected to the external antennas; and
a third connector configured to be connected to the antenna connection end of the wireless module, and
wherein the circuit comprises:

an internal/external antenna selection switch configured to select whether to use the external antennas or the internal antenna.

10. The wireless device according to claim 9, wherein the circuit outputs, through the antenna connection end, a control signal for selecting at least one external antenna of the external antennas connected to the antenna connection end.

11. The wireless device according to claim 10, wherein the antenna connection module further comprises:
a switch configured to select the external antenna connected to the second connector based on the control signal output from the circuit.

12. A field device control system comprising:
a field device;
a signal processing module configured to transmit signals to the field device and receive signals from the field device;
an antenna connection module configured to be connected to antennas; and
an wireless module configured to transmit signals between the antenna connection module and the signal processing module, and receive signals between the antenna connection module and the signal processing module,
wherein the wireless module comprises:
an antenna connection end configured to be connected to external antennas;
a circuit configured to select at least one of the external antennas connected to the antenna connection end, the circuit being configured to transmit and receive wireless signals by using the selected external antenna; and
a first connector configured to input and output signals which are transmitted and received by the circuit, and
wherein the antenna connection module comprises:
second connectors configured to be connected to the external antennas; and
a third connector configured to be connected to the antenna connection end of the wireless module.

13. The field device control system according to claim 12, wherein
the signal processing module further comprising:
a fourth connector configured to input and output signals with respect to the wireless module; and
a fifth connector configured to input and output signals with respect to the field device.

14. The field device control system according to claim 13, further comprising:
a first cable configured to connect the antenna connection end and the third connector; and
a second cable configured to connect the first connector and the fourth connector,
wherein a signal, which is transmitted from the field device to the signal processing module through the fifth connector, is transmitted from the signal processing module to the wireless module through the second cable, and transmitted from the wireless module to the antenna connection module through the first cable, and
wherein the wireless signal, which is received by the antenna connection module, is transmitted from the antenna connection module to the wireless module through the first cable, transmitted from the wireless module to the signal processing module through the second cable, and transmitted from the signal processing module to the field device through the fifth connector.

15. A wireless device which transmits wirelessly a first signal transmitted from a field device, and receives a second signal which is wirelessly transmitted and to be transmitted to the field device, the wireless device comprising:
a wireless module configured to transmit and receive signals wirelessly;
a signal processing module configured to transmit the first signal, which has been received from the field device, to the wireless module, the signal processing module being configured to output the second signal, which has been received from the wireless module, to the field device; and
a first cable which connects the wireless module and the signal processing module, the first cable being configured to transmit the first signal and the second signal,
wherein the wireless module comprises:
a connector configured to be connected to the first cable;
an antenna connection end configured to be connected to external antennas by a second cable which transmits a wireless signal; and
a circuit configured to select at least one of the external antennas connected to the antenna connection end, the circuit being configured to receive the first signal transmitted from the signal processing module through the first cable, the circuit being configured to generate a wireless signal based on the first signal, the circuit being configured to transmit the wireless signal from the selected external antenna through the second cable, the circuit being configured to process the second signal which is a wireless signal received by the selected external antenna and transmitted through the second cable, the circuit being configured to transmit the second signal to the signal processing module through the first cable.

* * * * *